US007647303B2

(12) United States Patent
Kudo

(10) Patent No.: US 7,647,303 B2
(45) Date of Patent: Jan. 12, 2010

(54) DOCUMENT PROCESSING APPARATUS FOR SEARCHING DOCUMENTS, CONTROL METHOD THEREFOR, PROGRAM FOR IMPLEMENTING THE METHOD, AND STORAGE MEDIUM STORING THE PROGRAM

(75) Inventor: Tomonori Kudo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 11/219,464

(22) Filed: Sep. 2, 2005

(65) Prior Publication Data

US 2006/0047732 A1 Mar. 2, 2006

(30) Foreign Application Priority Data

Sep. 2, 2004 (JP) ............................. 2004-255811

(51) Int. Cl.
*G06F 17/30* (2006.01)
*G06F 7/00* (2006.01)

(52) U.S. Cl. .................................. 707/3; 707/4; 707/10
(58) Field of Classification Search ........................ None
See application file for complete search history.

(56) References Cited

U.S. PATENT DOCUMENTS

| 5,963,942 A * | 10/1999 | Igata ............................. 707/6 |
| 6,714,927 B1 * | 3/2004 | Ogawa ........................... 707/3 |
| 7,031,910 B2 * | 4/2006 | Eisele .......................... 704/10 |
| 7,039,636 B2 * | 5/2006 | Tada et al. ..................... 707/4 |

FOREIGN PATENT DOCUMENTS

| JP | 05-174064 | 7/1993 |
| JP | 10-207988 A | 8/1998 |
| JP | 11-015826 | 1/1999 |
| JP | 11-045269 A | 2/1999 |
| JP | 2004-086307 A | 3/2004 |
| JP | 2004-240769 A | 8/2004 |

OTHER PUBLICATIONS

The above references were cited in a Feb. 3, 2009 Japanese Office Action that issued in Japanese Patent Application No. 2004-255811.
Kazuhiko Niimi et al. "Full-text retrieval using dependency structure and its evaluation", 11th Digital Library Workshop, University of Library and Information Science, Mar. 4, 1998, No. 11, pp. 27-34 (Partial English Translation).
Takaharu Oishi et al., "Document retrieval based on relationship among topics of substructures" research report vol. 98, No. 2, 98-DES-114, pp. 73-80, Information Processing Society of Japan, Jan. 19, 1998 (Partial English Translation).

* cited by examiner

*Primary Examiner*—Baoquoc N To
(74) *Attorney, Agent, or Firm*—Cowan, Liebowitz & Latman, P.C.

(57) ABSTRACT

A document processing apparatus which is capable of retrieving an object to be searched quickly and accurately. A target document is divided into a plurality of text blocks according to each of a plurality of search engines. An index of the target document based on a character string included in each of the text blocks is created according to each of the search engines.

9 Claims, 17 Drawing Sheets

*FIG. 8D*

TEXT 1 TEXT 1-1 TEXT 1-2

TEXT 2 TEXT 2-1 TEXT 2-2

TEXT 3 TEXT 3-1 TEXT 3-2

*FIG. 8E*

| TEXT 1 | TEXT 2 | TEXT 3 |
| --- | --- | --- |
| TEXT 1-1 | TEXT 2-1 | TEXT 3-1 |
| TEXT 1-2 | TEXT 2-2 | TEXT 3-2 |

FIG. 11

| ☐ | SEARCH RESULTS | |

Query: 1.1. Summary of DOM Core Interface   20

| Search Results (1-5) | out of 24 |

1. Attr(Common DOM API)
   Users and implementers of DOM⋯ Attr node inherits Node interface 2. XML:: DOM module
   DocumentType interface of DOM level 1 core⋯ define for document⋯

3. dw: XML: Effective XML process using DOM and XPath on Perl
   As for summary of DOM, and specifications of DOM, DOM can be applied to any programming language⋯

4. Web application configuring technique for various terminals
   "SGML parser based on DOM interface"   No.58⋯

5. SEshop.com/details of products: Java&XML⋯
   DOM and SAX DOM (Document Object Model) Java DOM (core) API Java DOM (XML⋯

| Search Results (1-5) | out of 24 |

| Next 5 |

FIG. 13

| Dim. 01 | Dim. 02 | Dim. 03 | Dim. 04 | Dim. 05 | Dim. 06 | Dim. 07 | Dim. 08 | Dim. 09 | Dim. 10 | ... |
|---|---|---|---|---|---|---|---|---|---|---|
| 0 | 23 | 32 | 0 | 0 | 10 | 0 | 0 | 0 | 3 | ... |
| 34 | 0 | 0 | 0 | 2 | 0 | 22 | 21 | 0 | 0 | ... |
| 4 | 22 | 0 | 4 | 0 | 0 | 0 | 0 | 9 | 0 | ... |
| 3 | 12 | 32 | 4 | 0 | 7 | 0 | 0 | 32 | 0 | ... |
| 0 | 0 | 0 | 0 | 0 | 0 | 0 | 14 | 0 | 0 | ... |
| 4 | 0 | 6 | 8 | 0 | 0 | 0 | 0 | 0 | 0 | ... |
| 4 | 5 | 0 | 0 | 0 | 0 | 24 | 23 | 5 | 0 | ... |
| 12 | 5 | 33 | 0 | 0 | 3 | 23 | 32 | 8 | 0 | ... |
| 1 | 0 | 0 | 0 | 0 | 0 | 12 | 0 | 0 | 0 | ... |
| 0 | 0 | 0 | 21 | 0 | 0 | 14 | 0 | 3 | 0 | ... |
| 0 | 10 | 0 | 9 | 0 | 0 | 21 | 24 | 0 | 0 | ... |
| 12 | 0 | 34 | 6 | 0 | 12 | 14 | 32 | 32 | 6 | ... |
| 0 | 0 | 19 | 0 | 0 | 0 | 22 | 0 | 0 | 0 | ... |
| 0 | 0 | 0 | 6 | 0 | 0 | 5 | 0 | 0 | 0 | ... |
| 13 | 11 | 34 | 3 | 8 | 0 | 0 | 44 | 0 | 12 | ... |

FIG. 14

| DOC. ID | Dim. 01 | Dim. 02 | Dim. 03 | Dim. 04 | Dim. 05 | Dim. 06 | Dim. 07 | Dim. 08 | Dim. 09 | Dim. 10 | ... |
|---|---|---|---|---|---|---|---|---|---|---|---|
| 6947 | 0.183 | 0.214 | 0.000 | 0.046 | 0.635 | 0.000 | 0.021 | 0.019 | 0.021 | 0.014 | ... |
| 6948 | 0.035 | 0.025 | 0.000 | 0.029 | 0.301 | 0.115 | 0.029 | 0.025 | 0.128 | 0.019 | ... |
| 6949 | 0.035 | 0.025 | 0.000 | 0.029 | 0.301 | 0.115 | 0.029 | 0.025 | 0.128 | 0.019 | ... |
| 6950 | 0.000 | 0.000 | 0.000 | 0.050 | 0.496 | 0.369 | 0.050 | 0.043 | 0.165 | 0.000 | ... |
| 6951 | 0.110 | 0.154 | 0.000 | 0.027 | 0.724 | 0.086 | 0.000 | 0.000 | 0.000 | 0.000 | ... |
| 6952 | 0.142 | 0.087 | 0.040 | 0.098 | 0.577 | 0.428 | 0.098 | 0.103 | 0.094 | 0.044 | ... |
| 6953 | 0.095 | 0.055 | 0.087 | 0.062 | 0.532 | 0.223 | 0.062 | 0.068 | 0.059 | 0.024 | ... |
| 6954 | 0.309 | 0.087 | 0.000 | 0.149 | 0.294 | 0.199 | 0.000 | 0.369 | 0.070 | 0.000 | ... |
| 6955 | 0.411 | 0.081 | 0.000 | 0.432 | 0.482 | 0.027 | 0.000 | 0.194 | 0.083 | 0.116 | ... |
| 6956 | 0.073 | 0.036 | 0.000 | 0.215 | 0.514 | 0.247 | 0.000 | 0.017 | 0.000 | 0.000 | ... |
| 6957 | 0.014 | 0.087 | 0.027 | 0.672 | 0.038 | 0.152 | 0.027 | 0.102 | 0.100 | 0.014 | ... |
| 6958 | 0.130 | 0.308 | 0.036 | 0.785 | 0.051 | 0.395 | 0.036 | 0.045 | 0.036 | 0.018 | ... |
| 6959 | 0.169 | 0.038 | 0.000 | 0.517 | 0.169 | 0.103 | 0.000 | 0.144 | 0.131 | 0.120 | ... |

DOCUMENT PROCESSING APPARATUS FOR SEARCHING DOCUMENTS, CONTROL METHOD THEREFOR, PROGRAM FOR IMPLEMENTING THE METHOD, AND STORAGE MEDIUM STORING THE PROGRAM

BACKGROUND OF THE INVENTION

1. Field of the Invention

The present invention relates to a document processing apparatus for searching documents, a control method therefor, a program for implementing the method, and a storage medium storing the program, and more particularly to a document processing apparatus for searching documents based on a plurality of search methods, a control method therefor, a program for implementing the method, and a storage medium storing the program.

2. Description of the Related Art

As a basic search method for searching a desired document (document data), there is conventionally known a keyword-based search which performs a search based on whether or not a given keyword or keywords (search query) is contained in the document. However, with the keyword-based search, it is difficult to quickly retrieve a desired document. Therefore, various other search methods and search engines have been devised.

The devised search engines for searching a desired document include a search engine which uses the relation between keywords or a degree of similarity in syntax information, and a search engine which uses a document vector characterizing the content of a document. As the search engine which uses the document vector, a search engine has been proposed, which uses a vector representation in terms of feature amounts corresponding to respective dimensions (classes) classified by meaning, field, or word of the content of a document, to determine a degree of similarity between documents by using an inner product (scalar product) of vectors of the respective documents, and retrieves a desired document based on the degree of similarity. Further, a document searching apparatus has been proposed, which has a plurality of search engines using various search methods installed therein, performs searches by switching over the plurality of search engines, and/or performs a comprehensive search based on results of search by the plurality of search engines.

Moreover, a search method has been proposed, which divides a given keyword into partial character strings each having n characters, and searches a document which includes all the partial character strings, to thereby narrows the scope of search (see Japanese Laid-Open Patent Publication (Kokai) No. H05-174064).

Also, a technique has been proposed, which merges a last sentence of a first text block and a head (first) sentence of a second text block, which is likely to be a continuation part of the last sentence of the first text block, into a merged character string for each pair of text blocks taken from a document with layout information, performs a morphological analysis on the merged character string, evaluates naturalness of the merged character string, to thereby determine the most natural connection order of the text blocks, and rearrange the text blocks according to the determined connection order (see Japanese Laid-Open Patent Publication (Kokai) No. H11-015826).

However, according to the above proposed document searching apparatus which searches documents based on a plurality of search methods, in spite of the fact that documents (document contents, kind of document, etc.) that can be retrieved efficiently and accurately are varied depending on individual search engines or search methods, an index for search is created based the entire document as a single object to be searched, regardless of which search engine or method is used for the search.

Therefore, when the object to be searched is a document containing a plurality of topics, the conventional document vector-based search engine cannot accurately retrieve that object, using the index created from the entire document as a single object to be searched. Further, none of the conventional keyword-based, keyword relation-based, and syntax information-based search engines can quickly retrieve documents containing large amounts of information.

SUMMARY OF THE INVENTION

It is therefore an object of the present invention to provide a document processing apparatus and a control method therefor, which are capable of retrieving an object to be searched quickly and accurately, as well as a program for implementing the method, and a storage medium storing the program.

To attain the above object, in a first aspect of the present invention, there is provided a document processing apparatus for searching documents according to a plurality of search methods, comprising a dividing unit that divides a target document into a plurality of blocks according to each of the search methods, and a creating unit that creates an index of the target document based on a character string included in each of the blocks obtained by the dividing unit according to each of the search methods.

With the above arrangement, a document search can be performed quickly and accurately in an environment where a plurality of search methods are used for the document search.

Preferably, the plurality of search methods include a first search method for searching a document based on a relation between words included in the character string, and the dividing unit divides the character string into text blocks each forming a sentence, according to the first search method.

More preferably, the plurality of search methods include a second search method for searching a document based on concepts of words included in the character string, and the dividing unit divides the character string into text blocks in units larger than in the first search method, according to the second search method.

Still more preferably, the plurality of search methods include a third search method for searching a document based on presence and absence of at least one word in the character string, and the dividing unit divides the character string into text blocks in units larger than in the second search method, according to the third search method.

To attain the above object, in a second aspect of the present invention, there is provided a document processing apparatus for searching documents according to a plurality of search methods, comprising a dividing unit that divides a character string included in a document from which a query for search is to be created, into a plurality of blocks according to each of the search methods, and a creating unit that creates the query for search based on a character string included in each of the blocks obtained by the dividing unit.

With the above arrangement, a document search can be performed quickly and accurately in an environment where a plurality of search methods are used for the document search.

Preferably, the plurality of search methods include a first search method for searching a document based on a relation between words included in the character string, and the dividing unit divides the character string into text blocks each forming a sentence, according to the first search method.

More preferably, the plurality of search methods include a second search method for searching a document based on concepts of words included in the character string, and the dividing unit divides the character string into text blocks in units larger than in the first search method, according to the second search method.

Still more preferably, the plurality of search methods include a third search method for searching a document based on presence and absence of at least one word in the character string, and the dividing unit divides the character string into text blocks in units larger than in the second search method, according to the third search method.

To attain the above object, in a third aspect of the present invention, there is provided a control method for a document processing apparatus for searching documents according to a plurality of search methods, comprising a dividing step of dividing a target document into a plurality of blocks according to each of the search methods, and a creating step of creating an index of the target document based on a character string included in each of the blocks obtained in the dividing step according to each of the search methods.

Preferably, the plurality of search methods include a first search method for searching a document based on a relation between words included in the character string, and in the dividing step, the character string is divided into text blocks each forming a sentence, according to the first search method.

More preferably, the plurality of search methods include a second search method for searching a document based on concepts of words included in the character string, and in the dividing step, the character string is divided into text blocks in units larger than in the first search method, according to the second search method.

Still more preferably, the plurality of search methods include a third search method for searching a document based on presence and absence of at least one word in the character string, and in the dividing step, the character string is divided into text blocks in units larger than in the second search method, according to the third search method.

To attain the above object, in a fourth aspect of the present invention, there is provided a control method for a document processing apparatus for searching documents according to a plurality of search methods, comprising a dividing step of dividing a character string included in a document from which a query for search is to be created, into a plurality of blocks according to each of the search methods, and a creating step of creating the query for search based on a character string included in each of the blocks obtained in the dividing step.

Preferably, the plurality of search methods include a first search method for searching a document based on a relation between words included in the character string, and in the dividing step, the character string is divided into text blocks each forming a sentence, according to the first search method.

More preferably, the plurality of search methods include a second search method for searching a document based on concepts of words included in the character string, and in the dividing step, the character string is divided into text blocks in units larger than in the first search method, according to the second search method.

Still more preferably, the plurality of search methods include a third search method for searching a document based on presence and absence of at least one word in the character string, and in the dividing step, the character string is divided into text blocks in units larger than in the second search method, according to the third search method.

To attain the above object, in a fifth aspect of the present invention, there is provided a program for causing a computer to implement a control method for a document processing apparatus for searching documents according to a plurality of search methods, comprising a dividing module for dividing a target document into a plurality of blocks according to each of the search methods, and a creating module for creating an index of the target document based on a character string included in each of the blocks obtained by the dividing module according to each of the search methods.

To attain the above object, in a sixth aspect of the present invention, there is provided a program for causing a computer to implement a control method for a document processing apparatus for searching documents according to a plurality of search methods, comprising a dividing module for dividing a character string included in a document from which a query for search is to be created, into a plurality of blocks according to each of the search methods, and a creating module for creating the query for search based on a character string included in each of the blocks obtained by the dividing module.

To attain the above object, in a seventh aspect of the present invention, there is provided a computer-readable storage medium storing the program according to the fifth aspect of the present invention.

To attain the above object, in an eighth aspect of the present invention, there is provided a computer-readable storage medium storing the program according to the sixth aspect of the present invention.

The above and other objects, features, and advantages of the invention will become more apparent from the following detailed description taken in conjunction with the accompanying drawings.

BRIEF DESCRIPTION OF THE DRAWINGS

FIGS. 8A to 8E are diagrams useful in explaining specific examples of the text block optimizing process of FIG. 6;

FIG. 11 is a view showing an example of search results displayed in the step S405 of FIG. 4;

FIG. 13 is a diagram useful in explaining a basic vector dictionary used in the index registering process of FIG. 9;

FIG. 14 is a diagram useful in explaining an example of an index table used in the index registering process of FIG. 9;

DETAILED DESCRIPTION OF THE PREFERRED EMBODIMENTS

The present invention will now be described in detail below with reference to the drawings showing preferred embodiments thereof.

Figure 1:
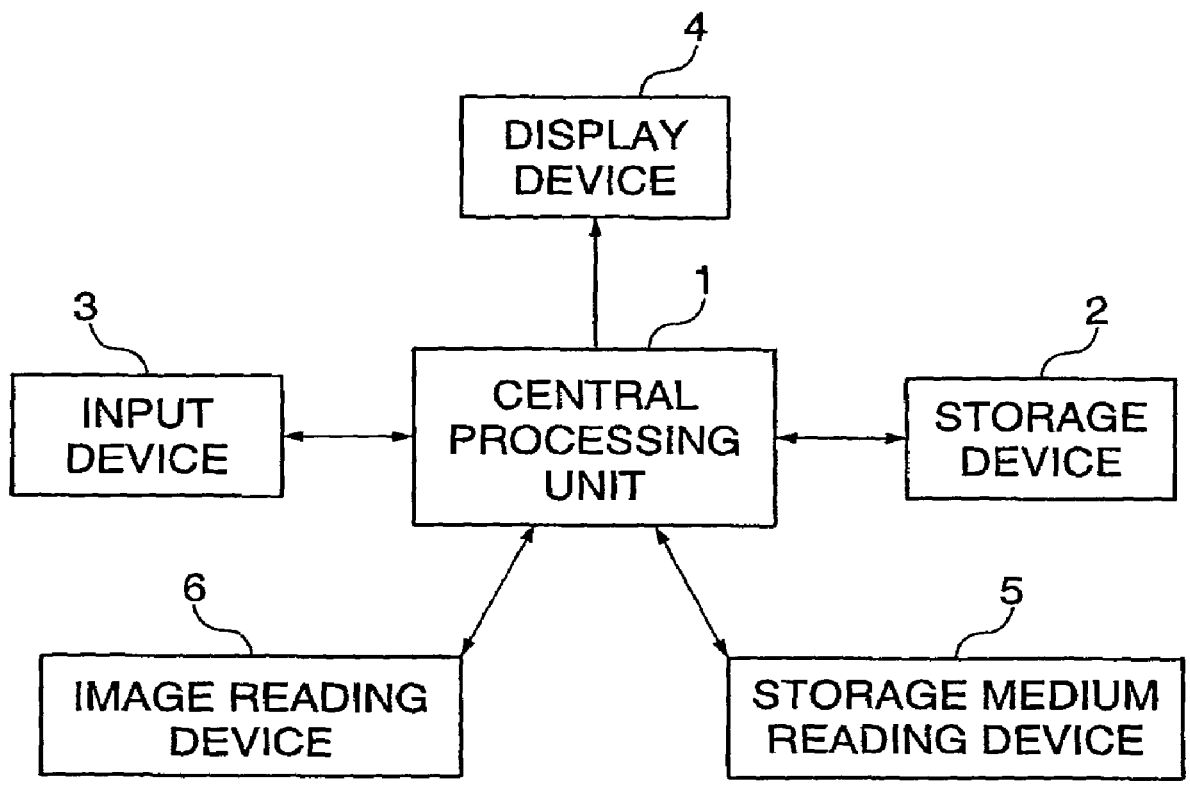
FIG. 1 is a block diagram schematically showing the arrangement of a document searching apparatus as a document processing apparatus according to a first embodiment of the present invention.

FIG. 1 is a block diagram schematically showing the arrangement of a document searching apparatus as a document processing apparatus according to a first embodiment of the present invention.

The present document searching apparatus is implemented by a computer such as a personal computer, and has a plurality of search engines using various search methods installed therein. As shown in FIG. 1, the document searching apparatus is comprised of a central processor 1, a storage device 2, an input device 3, a display device 4, a storage medium reading device 5, and an image reading device 6. Using these devices, the document searching apparatus implements an indexing function for creating an index of document data (including image data) that will be an object to be searched, and a document searching function for performing a document searching process by using the created index.

The central processor 1 is implemented by a CPU (Central Processing Unit), a MPU (Microprocessing Unit) or the like. By executing programs stored in the storage device 2, the central processor 1 executes various processes according to the present embodiment, including an indexing process and the document searching process. The storage device 2 is implemented by a hard disk or the like, and stores databases in which data of documents to be searched (target document data), image data with annotations, programs, dictionaries (including a basic vector dictionary), etc. The input device 3 is comprised of a keyboard, a mouse, etc., and is used to enter various data and commands. The display device 4 is implemented by a liquid crystal display or the like, and displays search results and others. The storage medium reading device 5 reads programs (including control programs corresponding to flowcharts described below, and programs corresponding to the plurality of search engines) and data stored in storage media such as a floppy (registered trademark) disk, a CD-ROM, a ROM, and a magnetic tape, and stores the read programs and data in the storage device 2. The image reading device 6 is implemented by a scanner or the like, and optically reads or scans an image formed on an original or the like, and converts the read image into electronic image data. Further, the image reading device 6 has an OCR (optical character reader) function for recognizing a character string (text) in the image data to convert the same into character codes.

Figure 2:
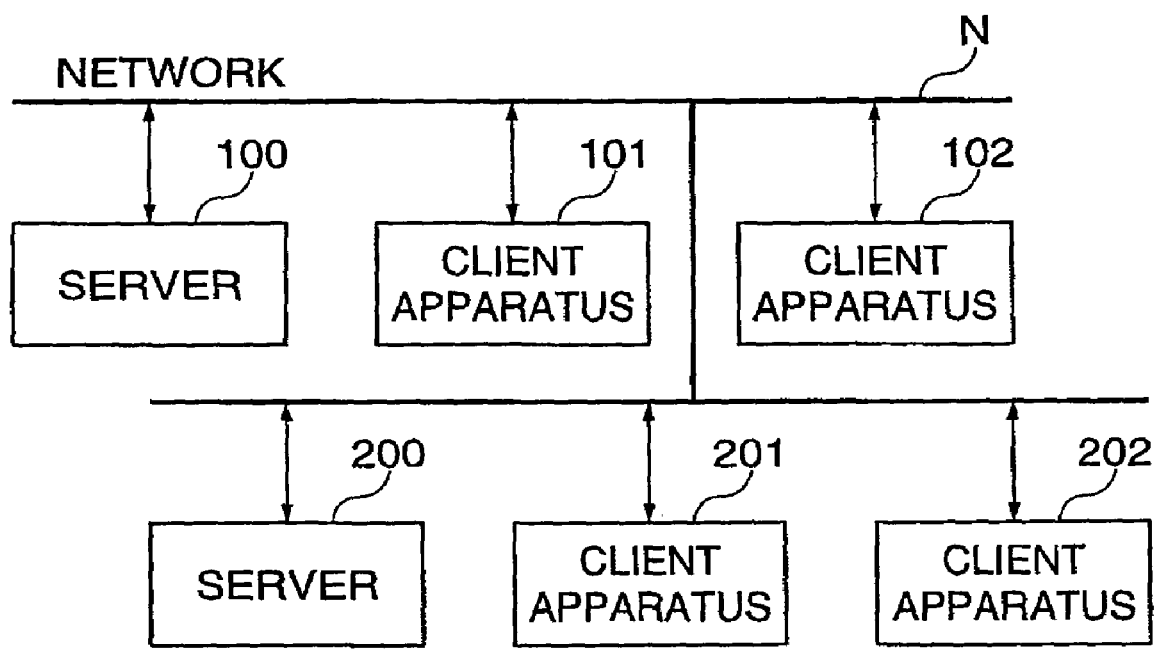
FIG. 2 is a diagram showing a first example of the arrangement of a communication network (e.g. LAN) to which the document searching apparatus in FIG. 1 is applied.
Figure 3:
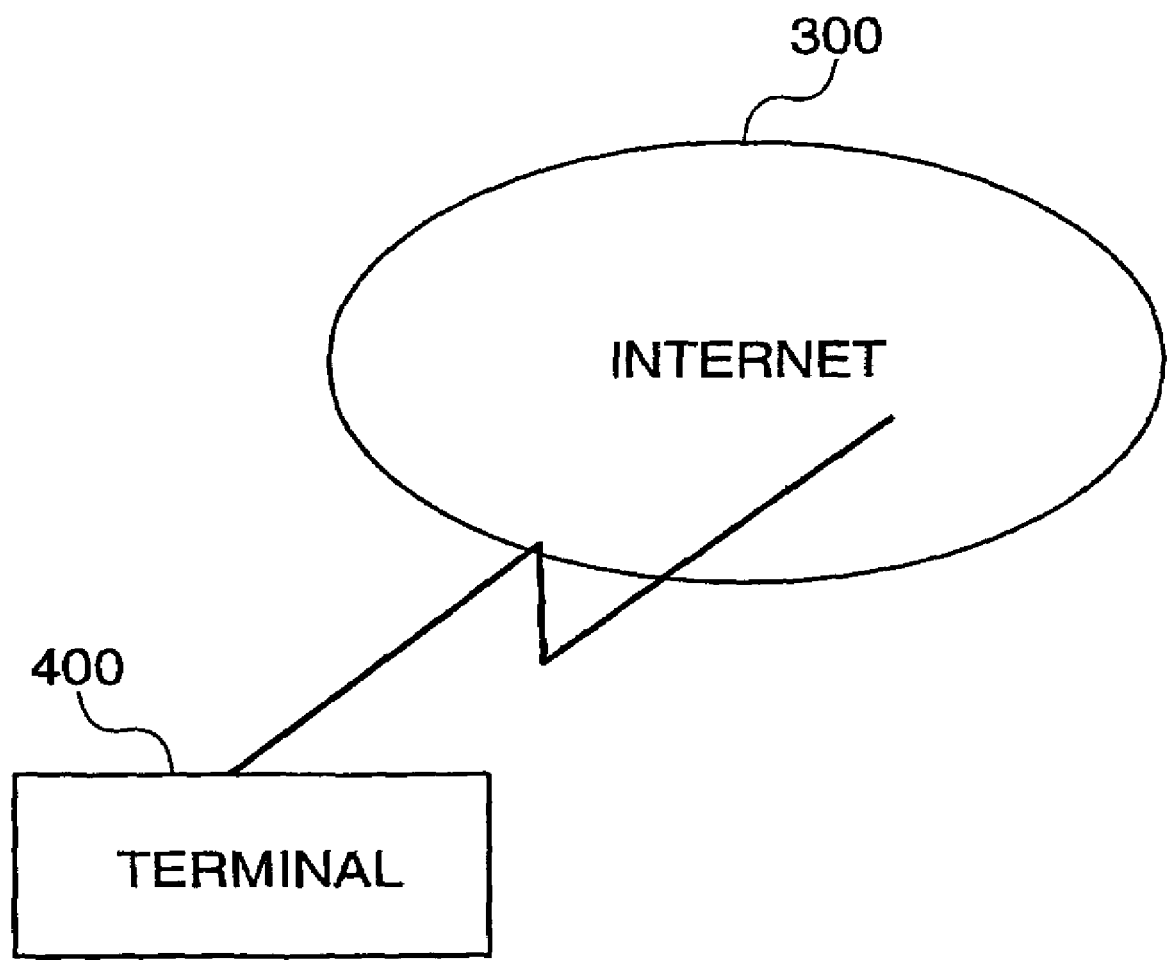
FIG. 3 is a diagram showing a second example of the arrangement of a communication network (Internet) to which the document searching apparatus in FIG. 1 is applied.

The document searching apparatus shown in FIG. 1 is applied to not only a standalone type but also server apparatuses 100 and 200, and client apparatuses 101, 102, 201, and 202 on a network N such as a local area network (LAN), as shown in FIG. 2. The document searching apparatus may also be applied to a terminal 400 and a server apparatus (not shown) connected to the Internet 300, as shown in FIG. 3.

Figure 4:
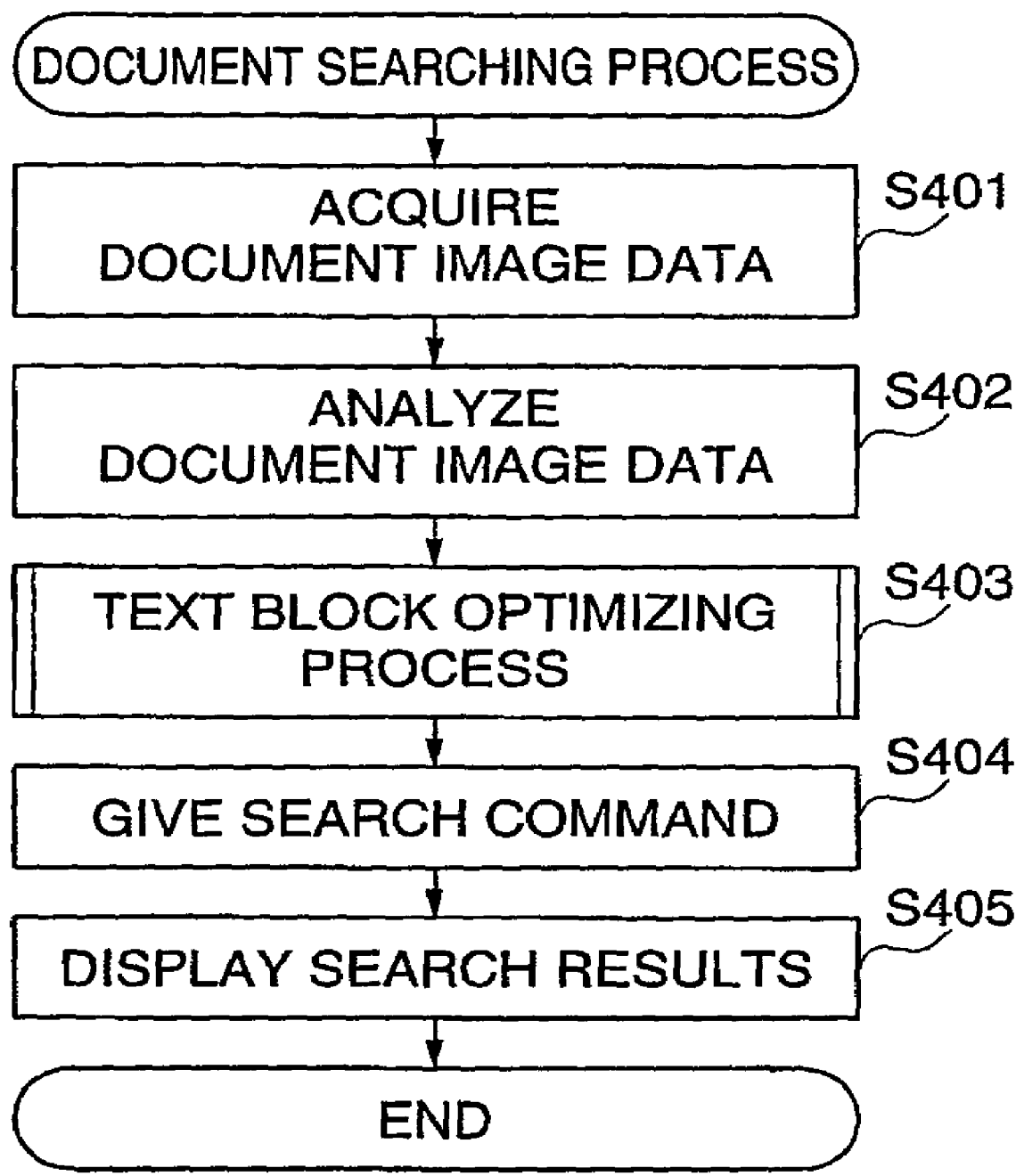
FIG. 4 is a flowchart showing a document searching process carried out by the communication network in FIG. 2.

Referring to FIG. 2, the server apparatuses 100 and 200 each have a document database provided therein, and supplies document data retrieved from the database to the client apparatuses 101, 102, 201, and 202. Any of the server apparatuses 100 and 200 and the client apparatuses 101, 102, 201, and 202 may have a document searching function to serve as the document searching apparatus. In the present embodiment, it is assumed that a process for selecting a search method (search engine) is performed by the client apparatuses 101, 102, 201, and 202. In the present embodiment, a document searching process of FIG. 4, described below, is performed by the client apparatuses 101, 102, 201, and 202, and searching, which is instructed in a step S404 in FIG. 4, is performed by the server apparatuses 100 and 200, that is, the server apparatuses 100 and 200 serves as the search engines. The indexing process of FIG. 5, described below, is performed by the client apparatuses 101, 102, 201, and 202, and the server apparatuses 100 and 200 execute registration of an index created in a step S505 in FIG. 5.

The outline of the document searching process executed in the communication network in FIG. 2 will now be described with reference to a flowchart in FIG. 4. The document searching process of FIG. 4 is executed by any of the client apparatuses 101, 102, 201, and 202 in FIG. 2.

The document searching process is comprised of an image acquiring process for acquiring document image data (step S401), an analyzing process for analyzing the acquired document image data (step S402), a text block optimizing process (step S403), a search instructing process for giving a search command (step S404), and a search result displaying process for displaying search results (step S405).

In the image acquiring process (step S401), document image data is acquired by the image reading device 6 such as the scanner scanning a document image. In the analyzing process (step S402), the document image data acquired in the step S401 is divided into photo image block(s) and text block (s) (character string block(s)). To acquire the text blocks by dividing, the OCR function is used to recognize character strings of the document image data.

Before executing the step S403, the user selects or designates a desired search engine (search method) in advance from among the plurality of search engines using various search methods, described below. In the text block optimizing process (step S403), the text blocks acquired in the step S402 is optimized by merging (joining) text blocks according to characteristics of the search engine designated in advance, or by splitting (dividing) text block(s) according to the characteristics of the search engine. In the search instructing process (step S404), the server apparatus 100 or 200 as the desired search engine is instructed by the client apparatus to carry out a document search using the text block(s) obtained in the step S403 as word(s) of inquiry (query) for the document database therein. In the search result displaying process (step S405), the client apparatus receives a list of documents as search results from the server apparatus, and displays the documents in the list in order of degree of matching (degree of similarity) to the query on the display device 4, as illustrated in FIG. 11, (or stores the received list in the storage device 2).

The outline of the indexing process carried out by the communication network in FIG. 2 will now be described with reference to a flowchart in FIG. 5. The indexing process is executed by any of the client apparatuses 101, 102, 201, and 202 to create an index for a document search.

The indexing process is comprised of a document image data acquiring process for acquiring document image data (step S501), an analyzing process for analyzing the acquired document image data (step S502), an indexing completion determining process for determining whether or not the indexing process is completed with respect to all search engines (step S503), a text block optimizing process for optimizing text blocks according to each of the search engines (step S504), and an indexing process for performing indexing according to each of the search engines (step S505).

In the document image acquiring process (step S501), a document image is acquired by the image reading device 6 such as a scanner canning document image data. In the analyzing process (step S502), the document image acquired in the step S501 is divided into photo image block(s) and text block(s). To acquire the text blocks by dividing, the OCR function is used to recognize character strings of the document image data.

In the indexing completion determining process (step S503), it is determined whether or not the indexing process is completed with respect to all the search engines installed in the document searching apparatus. In the text block optimizing process (step S504), the text blocks acquired in the step S502 is optimized by merging or joining the text blocks according to the characteristics of each of the search engines or methods, or by splitting (dividing) text block(s) according to the characteristics of each of the search engines or methods. In the indexing process (step S505), an index (index file, or index table) is created from the optimized text block(s), and the client apparatus sends the created index to the server apparatuses 100 and 200. Upon receiving the created index, each of the server apparatuses 100 and 200 stores the received index in the storage device 2 along with the document image data.

Next, a description will be given of details of the text block optimizing process executed in the step S403 in FIG. 4 and the step S504 in FIG. 5 with reference to a flowchart in FIG. 6 and diagrams shown in FIGS. 8A to 8E. In the present embodiment, based on text block(s) optimized by the text block optimizing process according to each of the search methods, an appropriate query and index is created.

Figure 5:
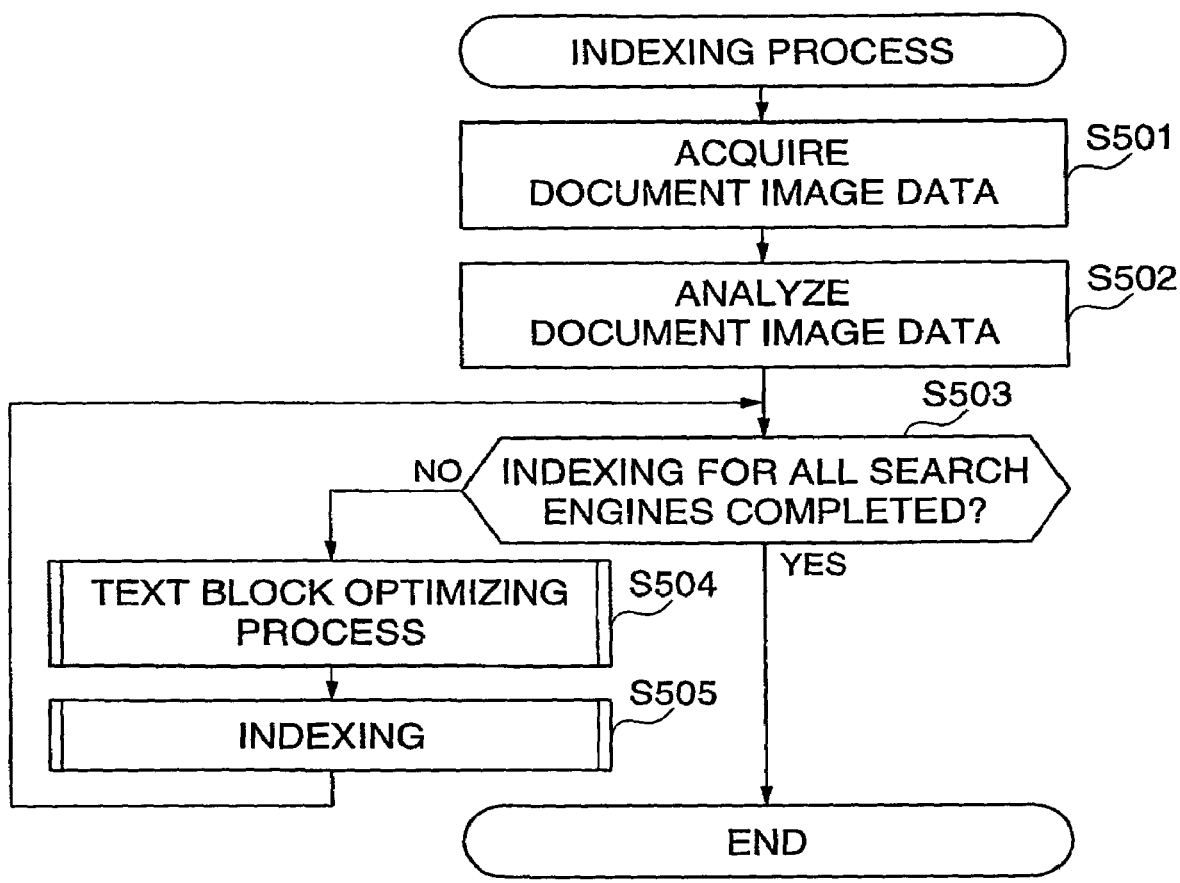
FIG. 5 is a flowchart showing an indexing process carried out by the communication network in FIG. 2.
Figure 6:
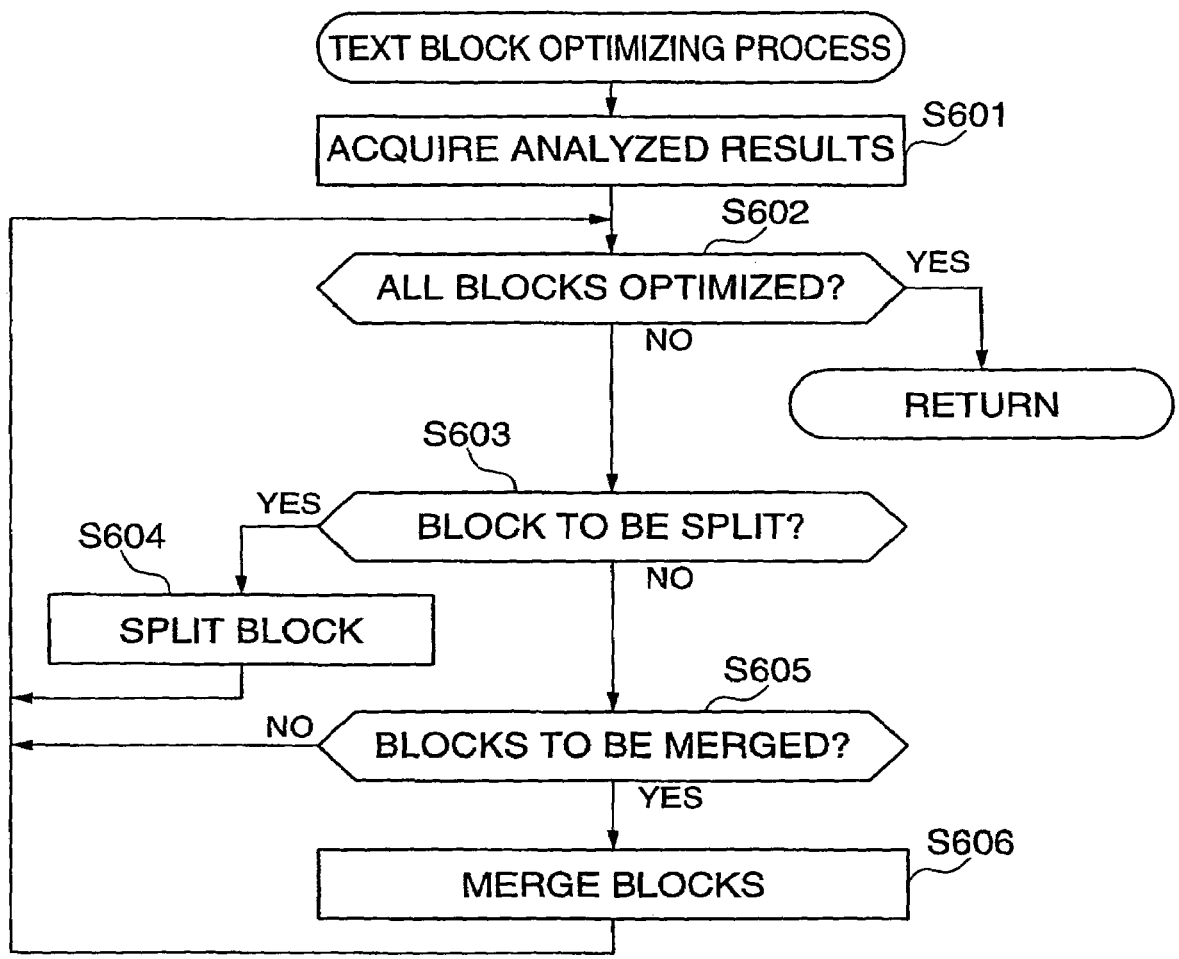
FIG. 6 is a flowchart showing a text block optimizing process executed in a step S403 of FIG. 4 and a step S504 of FIG. 5.
Figure 8A:
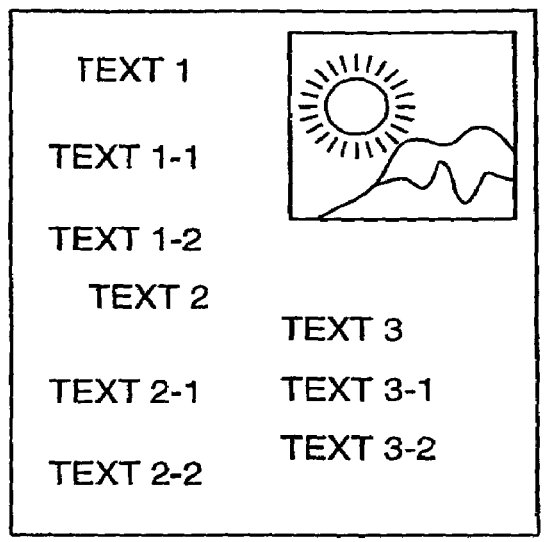
Figure 8B:
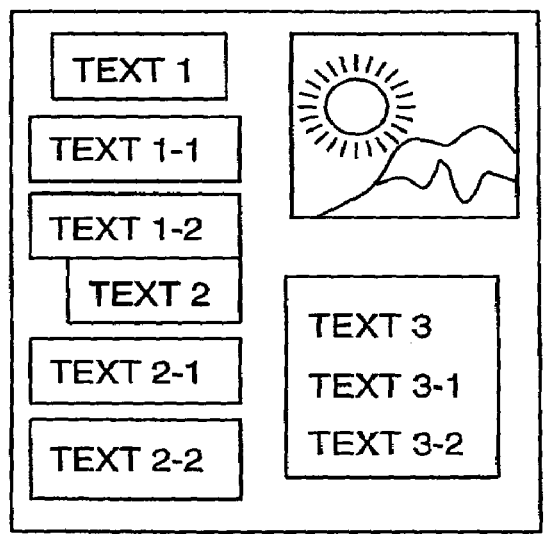

In the text block optimizing process, as shown in FIG. 6, first, the central processor 1 acquires photo block(s) and text block(s) as results of the execution of the analyzing process for analyzing document image data (analysis results) in the step S402 in FIG. 4 and in the step S502 in FIG. 5 (step S601). For example, in the case where document image data shown in FIG. 8A is analyzed, a photo block, i.e. a photo surrounded by a frame and text blocks, i.e. pieces of text each surrounded by a frame, "text1", "text1-1", "text1-2", "text2", "text2-1", "text2-2", and "text3, text3-1, text3-2", are obtained as shown in FIG. 8B. Next, the central processor 1 determines whether or not the text block optimization is completed with respect to all the obtained text blocks in FIG. 8B (step S602). The obtained text blocks are sequentially optimized by block merging or block splitting. Each time a text block is optimized, it is determined in the step S602 whether or not the optimization process is completed for all the text blocks obtained in the step S601.

Figure 8C:
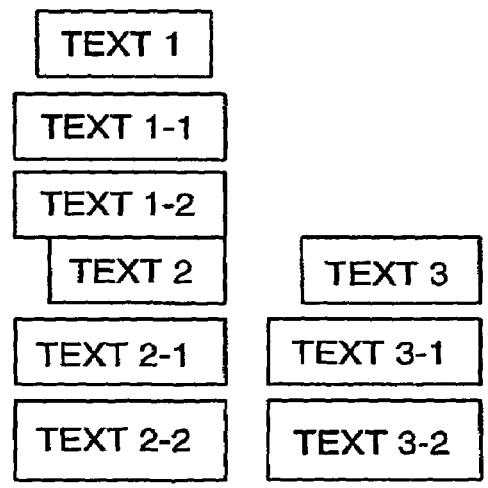

If the optimization process is not completed, the central processor 1 determines whether or not a text block of interest that has been not yet optimized is to be split according to the characteristics of a currently designated search engine (step S603). For example, if the document search is executed by a search engine which searches by phrase or by word (a key relation search engine which searches documents which have a high degree of similarity with respect to a keyword, for example, "market size of mobile devices and related devices", based on the relationship between divided words, for example, "market", "size", "of", "mobile", "devices", "and", "related", and "devices"), a more efficient search will be achieved when an index is created on a sentence-by-sentence basis. Thus, the central processor 1 determines that the text block of interest should be further split if the text block contains more than one sentence (step S603). Then, the text block is split into text blocks each forming a sentence (step S604). Assuming that in the example of FIG. 8B, each of the text blocks "text1", "text1-1", "text1-2", "text2", "text2-1", "text2-2", and "text3", "text3-1", and "text3-2" forms a single sentence, then the text block. "text3, text3-1, text3-2" forms three sentences. Hence, in the step S604, the text block "text3, text3-1, text3-2" is split into three text blocks "text3", "text3-1", and "text3-2" each forming a sentence, as shown in FIG. 8C.

If the central processor 1 determines that the text block of interest should not be split, then it is determined whether or not the text block of interest is to be merged with the next text block (that is not yet optimized) according to the characteristics of the currently designated search engine (step S605). For example, if the designated search engine is a concept vector-based search engine which carries out a search based on a concept vector for evaluating multidimensional semantic attributes representing the concept of a word, a more efficient and accurate search will be achieved when a single text block contains words which are similar in meaning or topic (concept vector) even if the same word as the keyword is not contained in the text block. Hence, if the text block of interest and the next block share the same or similar meaning or topic, they should be merged into a single text block for more efficient search. Therefore, if a paragraph (text portion) is likely to share a common topic, it is thus determined that the text block of interest should be merged with the next text block to form a paragraph larger than one sentence (step S605). Then, they are merged into a single text block (step S606).

Assuming that in the example of FIG. 8B, the text blocks "text1", "text1-1", and "text1-2" share a common topic (concept vector), and likewise the text blocks "text2", "text2-1", and "text2-2" share a common topic, the text blocks "text1", "text1-1", and "text1-2" are merged together, and likewise the text blocks "text2", "text2-1", and "text2-2" are merged together, as illustrated in FIG. 8E.

As described later with reference to FIGS. 7 and 12, when receiving a search request for a search based on a query of, for example, "market size of mobile devices and related devices", the search engine based on the concept vector creates concept vectors based on keywords "market", "mobile", and "device", and determines the degree of similarity between each of the created concept vectors and concept vectors of a target document. As a result, the search engine retrieves documents which are similar in content as a whole regardless of whether or not the documents contain the keywords associated with the query.

Similarly, as shown in FIG. 8D in the case of a vector-based search engine which determines the degree of similarity between documents based on only the presence/absence of words in the documents, document image data is divided into text blocks in units larger than in the key relation search engine or the concept vector-based search engine. Then, for example, the degree of similarity is determined using the whole document image data is used as a single text block.

A description will be given of a phrase searching process as a first example of the searching process (similarity-based searching process) executed in response to the search command in the step S404 in FIG. 4, with reference to FIGS. 7 and 12. The phrase searching process is executed by one of the server apparatus 100 and 200 which has received the search command in the step S404.

Figure 7:
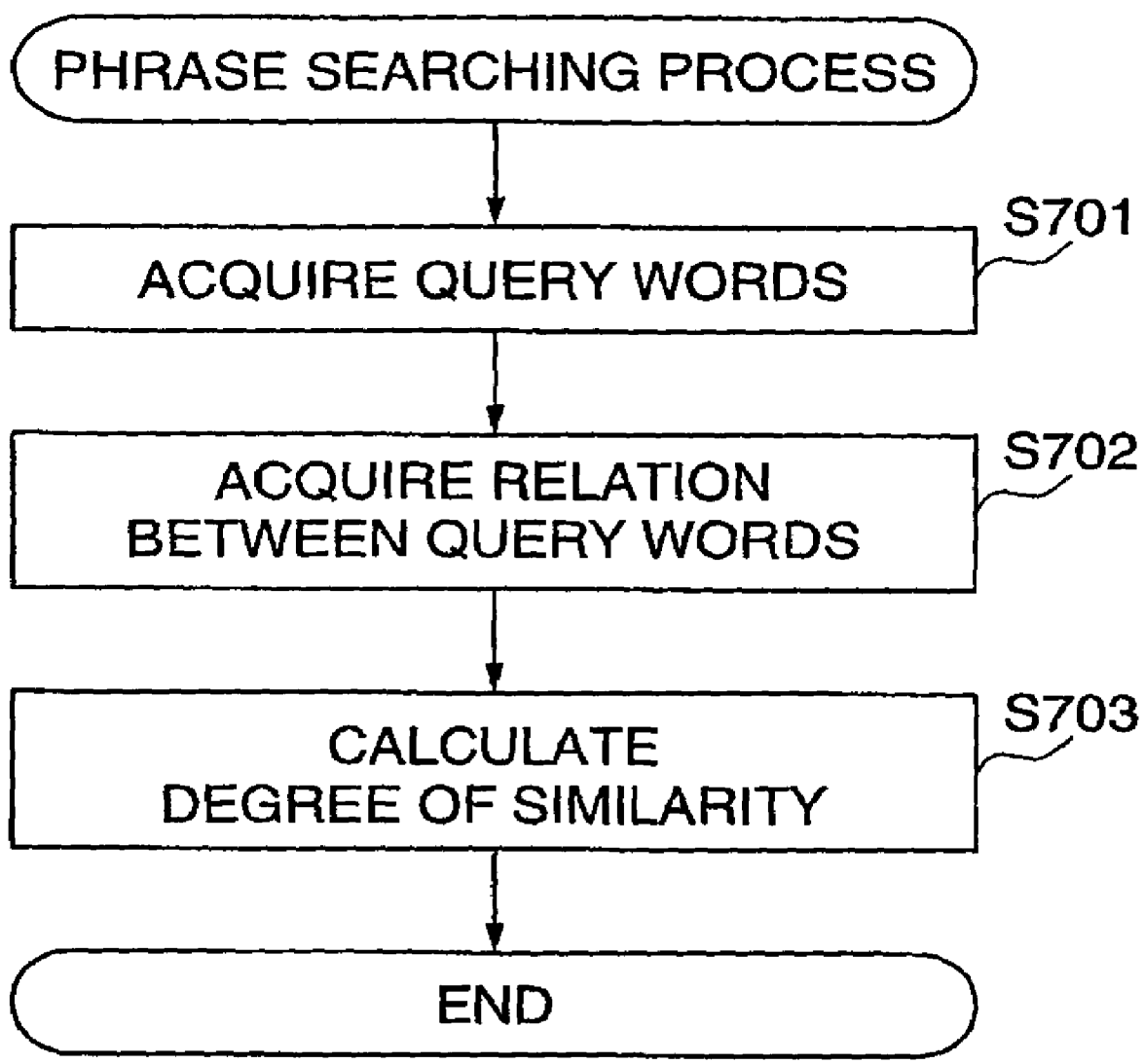
FIG. 7 is a flowchart showing a phrase searching process as a first example of a searching process (similarity-based searching process) executed in response to a search command in a step S404 in FIG. 4.

As shown in FIG. 7, the phrase searching process is comprised of a query word acquiring process (step S701), a relation acquiring process for acquiring the relation between the acquired query words (step S702), and a degree-of-similarity calculating process (step S703).

In the query word acquiring process (step S701), a morphological analysis of document data (character string) of the text block(s) optimized in the step S403 in FIG. 4 is performed, and then query words are acquired based on results of the analysis.

For example, the document data of the text block optimized in the step S403 in FIG. 4 contains a character string "perform printing of an image". Then, in the step S701, the morphological analysis of the character string "perform printing of an image" is performed, and then three query words and phrases of, "perform", "printing of", and "an image" are acquired.

In the relation acquiring process (step S702), syntax information on the query words acquired in the step S701 is acquired. For the acquired query words and phrases "perform", "printing of", and "an image" in the above example, syntax information indicating that "printing of" is modified by "an image" is acquired.

In the degree-of-similarity calculating process (step S703), the relation between the words and phrases acquired in the steps S701 and S702 (search condition) is compared with the relation between words and phrases in each target document registered in the document database and then a degree of similarity therebetween is calculated.

Figure 12A:
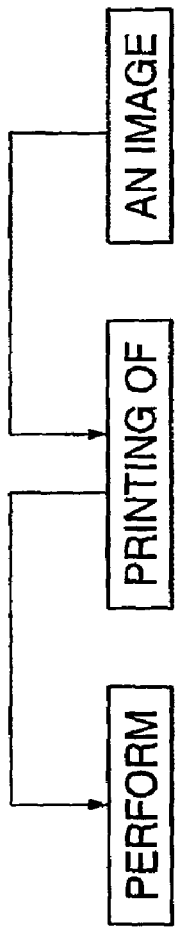
FIG. 12A is a diagram showing an example of a text block from which query words are acquired in the phrase searching process of FIG. 7.
Figure 12B:
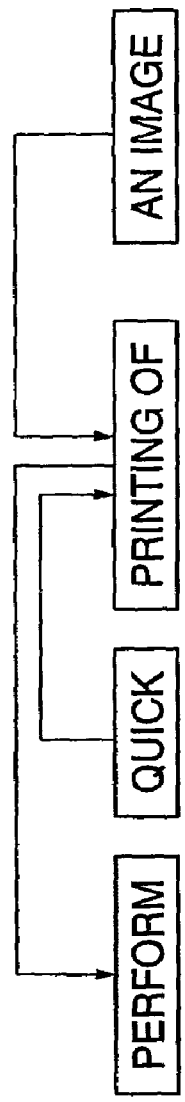
FIGS. 12B and 12C are diagrams showing examples of data of a target document in the phrase searching process of FIG. 7.

For example, a character string "perform quick printing of an image", consists of words and phrases "perform", "quick", "printing of" and "an image" in a document of FIG. 12B and shows that "printing of" is modified by "an image," and "printing of" is modified by "quick". Since "printing of" is modified by "an image", the query (FIG. 12A) and the document in FIG. 12B are similar to each other.

Therefore, assuming that the degree of similarity is set to 1 (reference degree of similarity) when two character strings contains exactly the same phrase, the reference degree of similarity is decreased by 0.7 when either of the character strings lacks a word or phrase, the reference degree of similarity is decreased by 0.1 per word when a word-to-word distance differs, and the reference degree of similarity is decreased by 0.5 when a different word is modified, when compared with the query in FIG. 12A, the document in FIG. 12B contains the same phrases and hence the degree of similarity is not decreased and is thus equal to 1, but it has a different word-to-word (i.e. "perform"-to-"printing of") distance by one word and one phrase and hence the degree of similarity is reduced by 0.2, that is, the degree of similarity is equal to 0.8 (=1−0.2). Similarly, a document shown in FIG. 12C, which contains a character string "read an image. perform printing of a document.", has a mismatched modification relation, that is, "printing of" is modified by "a document" instead of "an image" in FIG. 12A, and hence is given as a degree of similarity equal to 0.5 (=1−0.5) while no decrease due to lack of a word or phrase applies.

Figure 12C:
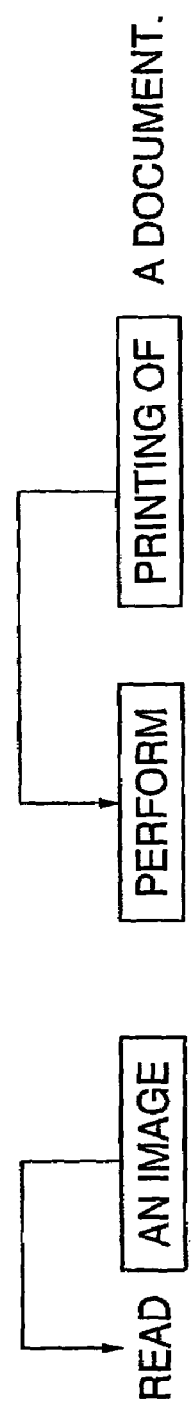

Therefore, since the document in FIG. 12B has a degree of similarity greater than that of the document in FIG. 12C, in the step S405 in FIG. 4, the document in FIG. 12B is displayed on the display device 2, or displayed at a position closer to the top of a list of search results similar to the one shown in FIG. 11, than that of the document in FIG. 12C.

A description will be given of a conceptual searching process as a second example of the searching process (similarity-based searching process) executed in response to a search command in the step S404 in FIG. 4, with reference to a flowchart of FIG. 10. The conceptual searching process is executed by one of the server apparatuses 100 and 200 which has received a search command in the step S404.

Figure 10:
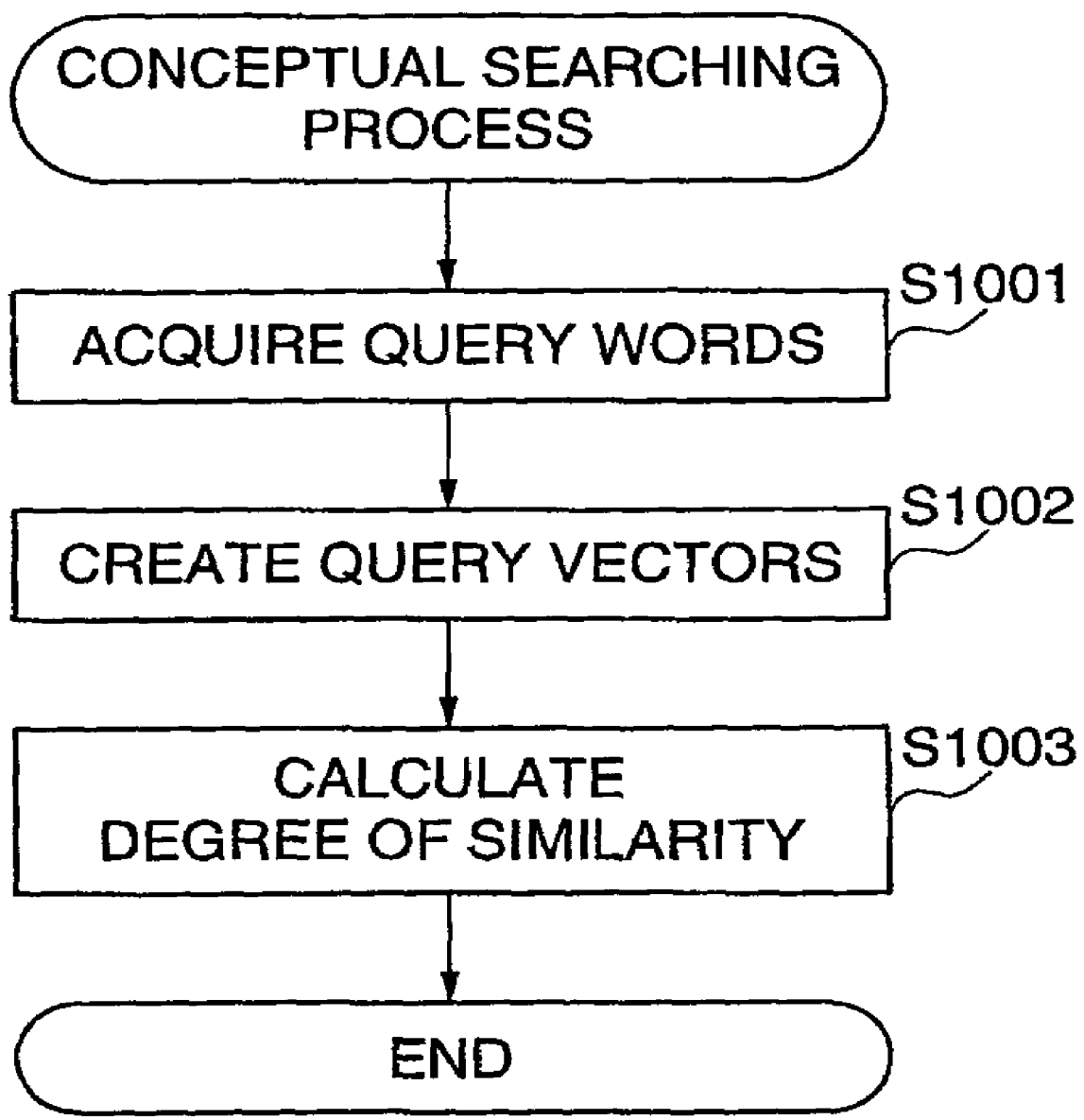
FIG. 10 is a flowchart showing a conceptual searching process as a second example of the searching process (similarity-based searching process) executed in response to the search command in the step S404 in FIG. 4.

As shown in FIG. 10, the conceptual searching process is comprised of a query acquiring process (step S1001), a query vector creating process (step S1002), and a degree-of-similarity calculating process (step S1003).

In the query acquiring process (step S1001), a morphological analysis of character string(s) of the text block(s) optimized in the step S403 in FIG. 4 is performed, and then query words are acquired based on results of the analysis.

In the query vector creating process (step S1002), query vectors representing feature vectors of the query words acquired in the step S1001 are created. In the degree-of-similarity calculating process (step S1003), the query vectors created in the step S1002 are compared with a document vector of each document stored in the storage device 2, to calculate a degree of similarity therebetween, and those documents having relatively high degrees of similarity are displayed in a list as search results.

A description will now be given of an index registering process executed in response to the indexing process in the step S505 in FIG. 5, with reference to FIGS. 9, 13, and 14. The index registering process is executed by one of the server apparatuses 100 and 200 which has received the index created in the step S505 in FIG. 5.

Figure 9:
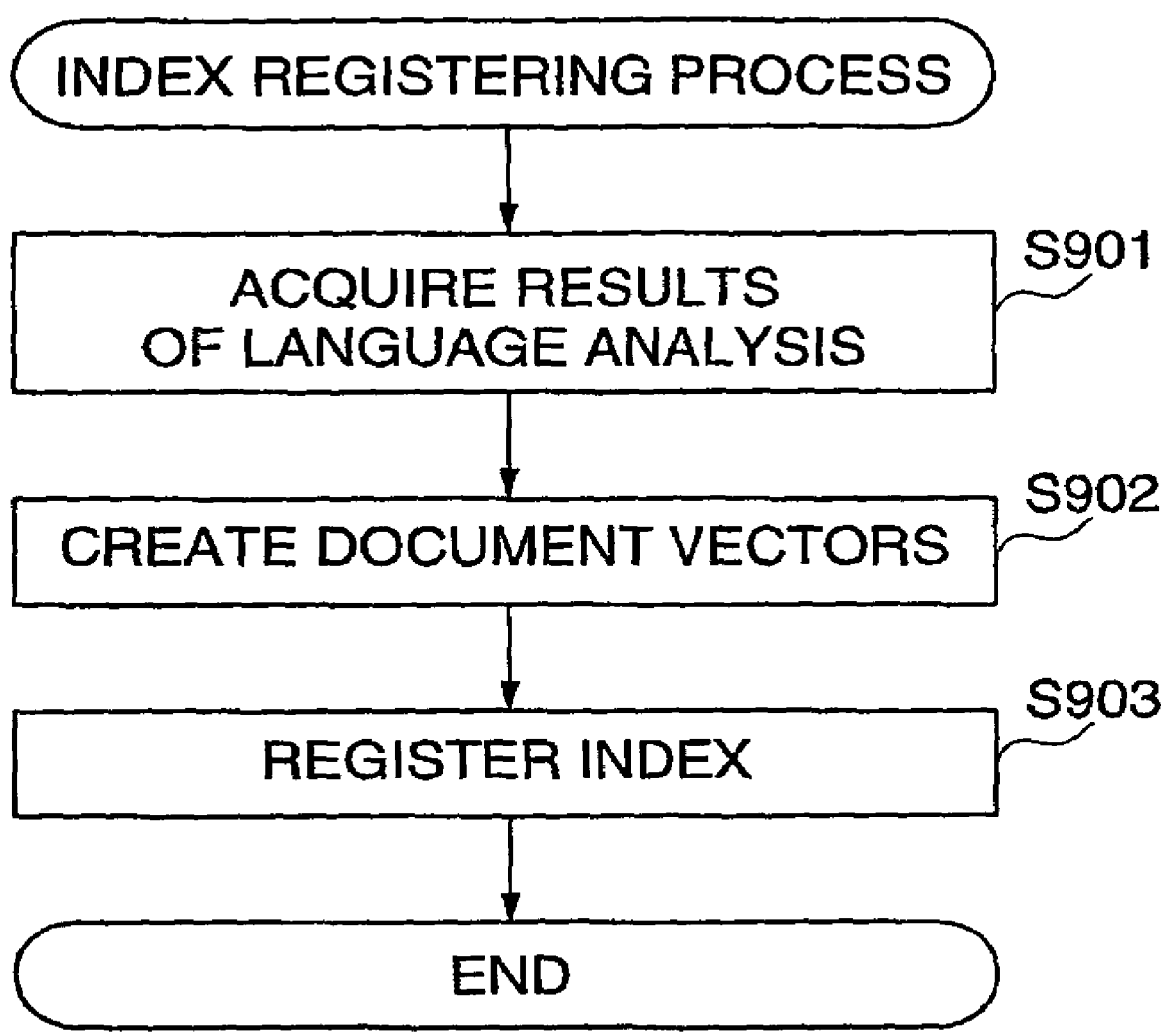
FIG. 9 is a flowchart showing an index registering process executed in response to an indexing process in a step S505 in FIG. 5.

As shown in FIG. 9, the index registering process is comprised of a language analysis result acquiring process (step S901), a document vector creating process (step S902), and an index registration executing process (step S903).

When registering a document (document data) in the storage device 2, the language analysis result acquiring process is executed (step S901) to acquire words included in the document for registration. Next, the document vector creating process (step S902) is executed to search, using a basic vector dictionary in FIG. 13, described below, for the words acquired in the step S901, to obtain feature amounts of respective dimensions for the respective words, and create document vectors from the sum of the feature amounts for the respective words. Then, the index registration executing process (step S903) is executed to register in the storage device 2 the document vectors created in the step S902 in association with corresponding documents (document data) or document identifiers thereof.

FIG. 13 is a diagram useful in explaining the basic vector dictionary. As illustrated in FIG. 13, the basic vector dictionary has stored therein, for each word, feature amounts of respective dimensions (Dim.) in which the word is expressed in vector representation. The dimensions are based on criteria classified according to the original meaning of the word, and/or obtained based on classification according to the proper meaning of the word or the field in which the word is used. In the example of FIG. 13, a word on the uppermost row has a feature amount "0" for a dimension "Dim. 01", a feature amount "23" for a dimension "Dim. 02", and so forth, and a word on the second uppermost row has a feature amount. "34" for the dimension "Dim. 01", a feature amount "0" for the dimension "Dim. 02", and so forth. In this way, feature amounts of respective dimensions of a word can be retrieved from the basic vector dictionary. A feature amount of a dimension for a word can be regarded as a measure of how much a document that contains the word characterizes the class (i.e. dimension). Based on the feature amounts of all constituent words of a document with respect to all dimensions (classes), feature amounts of the entire document are represented by a vector.

Then, in the index registration executing process (step S903), the vector is normalized with norm=1 to a document vector which is then stored as an index in an index table shown in FIG. 14. As shown in FIG. 14, a document vector of a document corresponding to "document ID=6947" has a feature amount of 0.183 for a dimension "Dim. 01", a feature amount of 0.214 for a dimension "Dim. 02", and so forth, and a document vector of a document corresponding to "document ID=6948" has a feature amount of 0.035 for the dimension "Dim. 01", a feature amount of 0.025 for the dimension "Dim. 02", and so forth.

As described above, according to the first embodiment, a target document containing character strings is divided into a plurality of text blocks according to each of a plurality of search methods. Based on a character string of each divided text block, an index of the target document corresponding to each of the plurality of the search methods is created. Further, a character string from which a search query is to be created is divided into a plurality of blocks (query words) according to each of the plurality of search methods. Based on a character string of each divided block, a search query is created. As a result, a document search can be performed quickly and accurately when a plurality of search methods are used for the document search.

Figure 15:
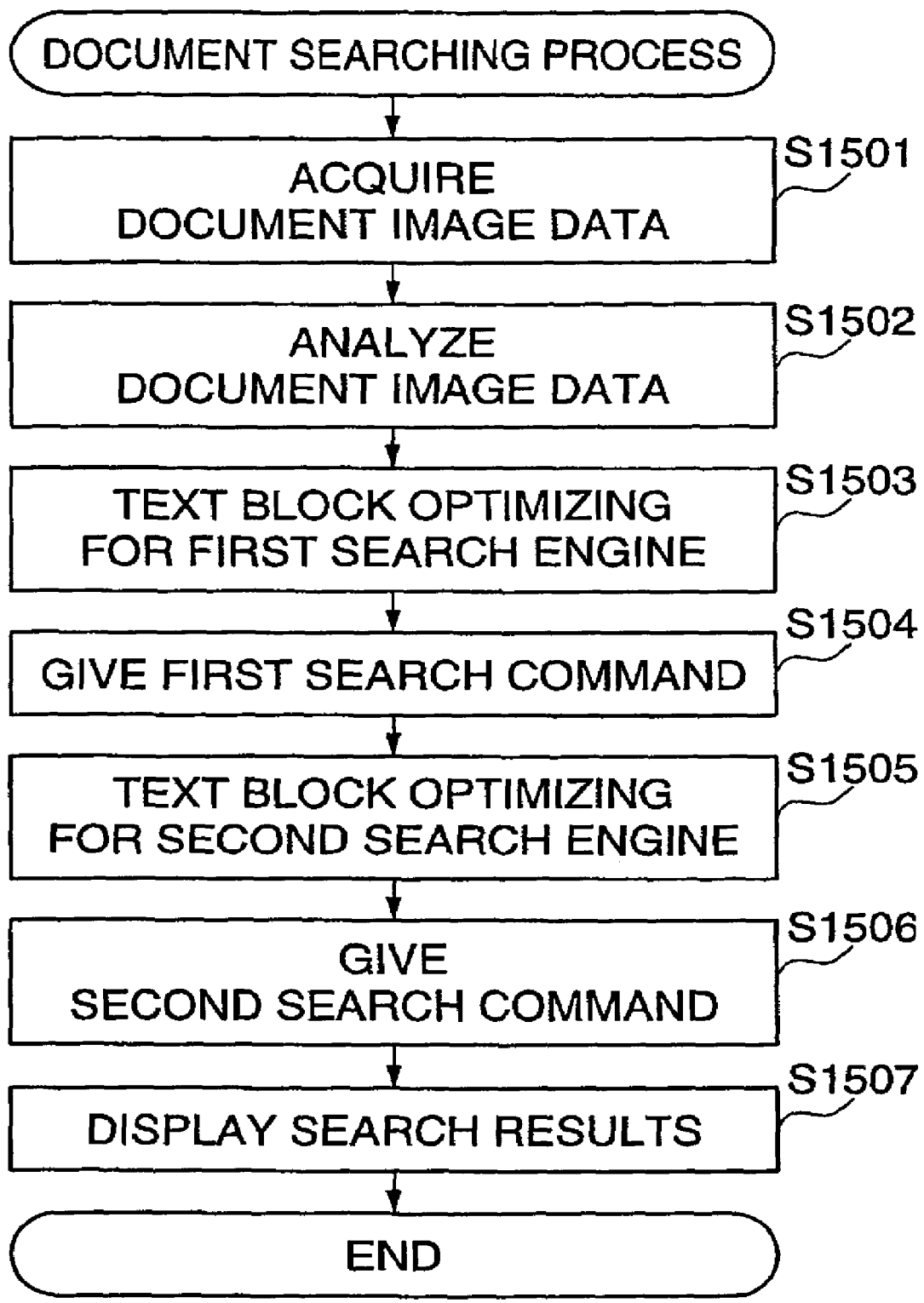
FIG. 15 is a flowchart showing a document searching process executed by a document processing apparatus according to a second embodiment of the present invention.

FIG. 15 is a flowchart showing a document searching process according to a second embodiment of the present invention. The document searching process is executed by any of the client apparatuses 101, 102, 201, and 202.

As shown in FIG. 15, the document searching process is comprised of a document image data acquiring process for acquiring document image data (step S1501), a document image data analyzing process for analyzing the acquired document image data (step S1502), a text block optimizing process for a first search engine (step S1503), a first search command giving process (step S1504), a text block optimizing process for a second search engine (step S1505), a second search command giving process (step S1506), and a search result displaying process for displaying search results (step S1507).

In the document image data acquiring process (step S1501), document image data is acquired by the image reading device 6 such as a scanner by scanning a document, for example. In the document image data analyzing process (step S1502), the document image acquired in the step S1501 is divided into photo image block(s) and text block(s). In the text block optimizing process for the first search engine (step S1503), the text block(s) acquired in the step S1502 is(are) optimized by merging (joining) the text blocks according to characteristics of the first search engine, or by splitting (dividing) the text block(s) according to the characteristics of the first search engine. In the first search command giving process step S1504, the first search command is given to the server apparatus in FIG. 2 as the first search engine from the client apparatus to execute a document search by using text block(s) obtained in the step S1503 as a query. In the text block optimizing process for the second search engine (step S1505), the text block(s) acquired in the step S1502 is(are) optimized by merging (joining) the text blocks according to characteristics of the second search engine, or by splitting (dividing) the text block(s) according to the characteristics of the second search engine. In the second search command giving process step S1506, the second search command is given to the server apparatus in FIG. 2 as the second search engine from the client apparatus to execute a document search or refine search by using text block(s) obtained in the step S1505 as a query. In the search result displaying process (step S1507), using the search results obtained in response to the search commands in the steps S1504 and S1506, documents as results of search are displayed in a list in order of degree of matching (degree of similarity) on the display device 4, as illustrated in FIG. 11, or the list is stored in the storage device 2.

As described above, according to the second embodiment, text block(s) is(are) optimized according to each of the two search engines, and the two search engines are caused to cooperate to execute a document search using these optimized text blocks as a query. As a result, compared with the first embodiment in which a single search engine is designated in advance and then the designated search engine is caused to execute a document search, a more accurate document search can be performed. Alternatively, three or more search engines may be used to execute a document search in cooperation in the manner as described above.

Figure 16:
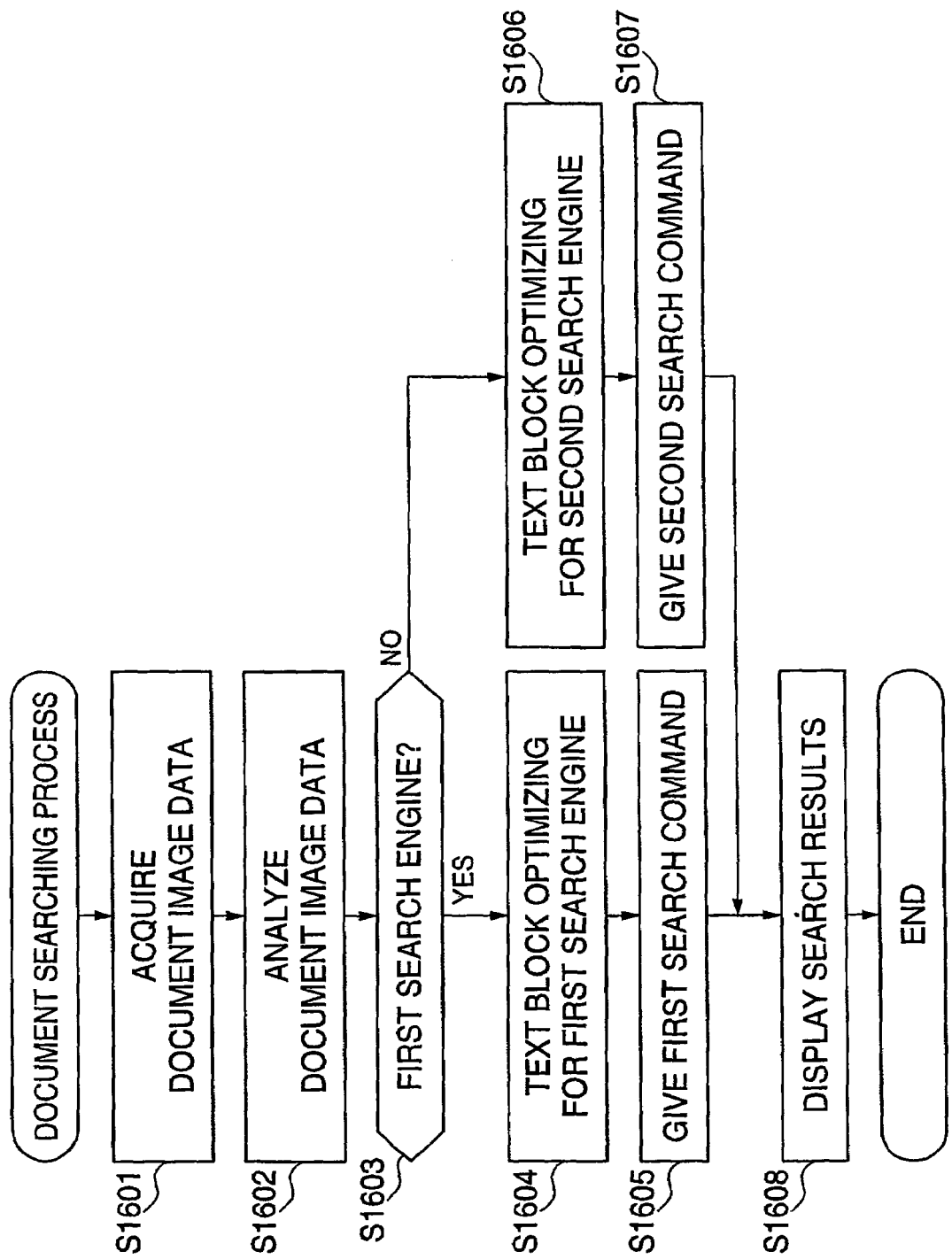
FIG. 16 is a flowchart showing a document searching process performed by a document processing apparatus according to a third embodiment of the present invention.

FIG. 16 is a flowchart showing a document searching process according to a third embodiment of the present invention. The present document searching process is executed by any of the client apparatuses 101, 102, 201, and 202.

As shown in FIG. 16, the document searching process is comprised of a document image data acquiring process for acquiring document image data (step S1601), a document image data analyzing process for analyzing the acquired document image data (step S1602), a selecting process (step S1603) for selecting a search method (search engine) from first and second search engines (search engines), a text block optimizing process for the selected first search engine (step S1604), a text block optimizing process for the selected second search engine (step S1606), a first command giving process (step S1605), a second command giving process (step S1607), and a search result displaying process for displaying search results of a search carried out in response to the first or second search command.

In the document image data acquiring process (step S1601), document image data is acquired by the image reading device 6 such as a scanner by scanning a document, for example. In the document image data analyzing process (step S1602), the document image acquired in the step S1601 is divided into photo image block(s) and text block(s).

In the selecting process (step S1603), either of the search method according to the first search engine and the search method according to the second search engine is automatically selected based on characteristics of the text block(s) acquired in the step S1602. In the text block optimizing process for the first search engine (step S1604), when the search method according to the first search engine is selected, the text block(s) acquired in the step S1602 is(are) optimized by merging the text blocks according to characteristics of the first search engine, or by splitting (dividing) the text block(s) according to the characteristics of the first search engine. In the first search command giving step S1605, the first search command is given to the server apparatus in FIG. 2 as the first search engine from the client apparatus to execute a document search by using text block(s) obtained in the step S1604 as a query. In the text block optimizing process for the second search engine (step S1606), when the search method according to the second search engine is selected, the text block(s) acquired in the step S1602 is(are) optimized by merging the text blocks according to characteristics of the second search engine, or by splitting the text block(s) according to the characteristics of the second search engine. In the second search command giving step S1607, the second search command is given to the server apparatus in FIG. 2 as the second search engine from the client apparatus to execute a document search by using text block(s) obtained in the step S1606, as a query.

As described above, according to the third embodiment, a search method or engine is automatically selected based on characteristics of text block(s) obtained by the analysis of document image data. Then, according to the characteristics of the selected search engine, the text block(s) is(are) optimized by merging or splitting. Further, the selected search engine is caused to execute a document search using the optimized text block(s) as a search query. As a result, there is no need for the user to designate for selection a suitable search engine for the content of a document from which a search query is created, whereby user-friendliness is enhanced. The third embodiment can also be applied to a case where three or more search engines are installed.

The present invention is not limited to the above described embodiments. The present invention may either be applied to a system composed of a plurality of apparatuses or to a single apparatus.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may also be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided on an expansion board inserted into a computer or a memory provided in an expansion unit connected to the computer and then causing a CPU or the like provided in the expansion board or the expansion unit to perform a part or all of the actual operations based on the instructions of the program code.

CROSS REFERENCE TO RELATED APPLICATION

This application claims priority from Japanese Patent Application No. 2004-255811 filed Sep. 2, 2004, which is hereby incorporated by reference herein.

What is claimed is:

1. A document processing apparatus for searching a document from registered documents according to a plurality of search methods, comprising:

an acquiring unit adapted to acquire a plurality of character strings from a target document in the registered documents;

a receiving unit adapted to receive an information which indicates a search method selected from the plurality of search methods by a user;

an optimizing unit adapted to optimize the acquired character strings to obtain blocks by joining at least two of the acquired character strings into one of the blocks or dividing at least one of the acquired character strings into some of the blocks according to the search method indicated by the information;

a creating unit that creates an index of the target document from each of the blocks optimized by said optimizing unit; and a document searching unit that performs a document searching process by using the created index.

2. The document processing apparatus as claimed in claim 1, wherein the plurality of search methods include a first search method for searching a document based on a relation between words included in each of the character strings in the target document, and wherein said optimizing unit optimizes the acquired character strings into first blocks each forming a sentence as the blocks, in the case where the first search method is selected by a user.

3. The document processing apparatus as claimed in claim 2, wherein the plurality of search methods include a second search method for searching a document based on concepts of words included in each of the character strings in the target document, and wherein said optimizing unit optimizes the acquired character strings into the first blocks and further, when at least two of the successive first blocks sharing a common concept, optimizes the at least two of the successive first blocks into a second block as one of the blocks, in the case where the second search method is selected by a user.

4. The document processing apparatus as claimed in claim 3, wherein the plurality of search methods include a third search method for searching a document based on presence and absence of at least one word in each of the character strings in the target document, and wherein said optimizing unit optimizes the acquired character strings into at least one of third blocks larger than the first blocks and the second block, in the case where the third search method is selected by a user.

5. A computer-readable storage medium storing a program for causing a computer to implement a control method for a document processing apparatus for searching a document from registered documents according to a plurality of search methods, the program comprising:

an acquiring module for acquiring a plurality of character strings from a target document in the registered document;

a receiving module for receiving an information which indicates a search method selected from the plurality of search methods by a user;

an optimizing module for optimizing the acquired character strings to obtain blocks by joining at least two of the acquired character strings into one of the blocks or dividing at least one of the acquired character strings into some of the blocks according to the search method indicated by the information;

a creating module for creating an index of the target document from each of the blocks optimized by said optimizing module; and a document searching module for performing a document searching process by using the created index.

6. The computer-readable storage medium as claimed in claim 5, wherein the plurality of search methods include a first search method for searching a document based on a relation between words included in each of the character strings in the target document, and wherein by said optimizing module, the acquired character strings are optimized into first blocks each forming a sentence as the blocks, in the case where the first search method is selected by a user.

7. The computer-readable storage medium as claimed in claim 6, wherein the plurality of search methods include a second search method for searching a document based on concepts of words included in each of the character strings in the target document, and wherein by said optimizing module, the acquired character strings are optimized into the first blocks and further, when at least two of the successive first blocks sharing a common concept, optimizes the at least two of the successive first blocks into a second block as one of the blocks, in the case where the second search method is selected by a user.

8. The computer-readable storage medium as claimed in claim 7, wherein the plurality of search methods include a third search method for searching a document based on presence and absence of at least one word in each of the character strings in the target document, and wherein by said optimizing module, the acquired character strings are optimized into at least one of third blocks larger than the first blocks and the second block, in the case where the third search method is selected by a user.

9. A computer-readable storage medium storing a program for causing a computer to implement a control method for a document processing apparatus for searching a document from registered documents according to a plurality of search methods, the program comprising:

an acquiring module for acquiring a plurality of character strings from a target document in the registered documents;

a receiving module for receiving an information which indicates a search method selected from the plurality of search methods by a user;

an optimizing module for optimizing the acquired character strings to obtain blocks by joining at least two of the acquired character strings into one of the blocks or dividing at least one of the acquired character strings into some of the blocks according to the search method indicated by the information;

a creating module for creating an index of the target document from each of the blocks optimized by said optimizing module; and a document searching module for performing a document searching process by using the created index;

wherein said plurality of search methods include:

a first search method for searching a document based on a relation between words included in each of the character strings in the target document;

a second search method for searching a document based on concepts of words included in each of the character strings in the target document; and a third search method for searching a document based on presence and absence of at least one word in each of the character strings in the target document;

and wherein:

said optimizing module optimizes the acquired character strings into first blocks each forming a sentence as the blocks if said first search method is selected by a user;

said optimizing module optimizes the acquired character strings into the first blocks and further, when at least two of the successive first blocks share a common concept, optimizes the at least two of the successive first blocks into a second block as one of the blocks if said second search method is selected by a user; and said optimizing module optimizes the acquired character strings into at least one of third blocks larger than the first blocks and the second blocks if said third search method is selected by a user.

* * * * *